United States Patent
Proux et al.

(10) Patent No.: US 8,204,748 B2
(45) Date of Patent: Jun. 19, 2012

(54) SYSTEM AND METHOD FOR PROVIDING A TEXTUAL REPRESENTATION OF AN AUDIO MESSAGE TO A MOBILE DEVICE

(75) Inventors: Denys M. Proux, Eybens (FR); Eric H. Cheminot, Meylan (FR)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 11/415,792

(22) Filed: May 2, 2006

(65) Prior Publication Data

US 2007/0260456 A1 Nov. 8, 2007

(51) Int. Cl.
*G10L 21/00* (2006.01)

(52) U.S. Cl. ........ 704/270; 704/275; 704/251; 455/563; 455/413; 379/88.01; 379/93.24

(58) Field of Classification Search ............... 704/235, 704/270, 275; 455/563, 413; 379/88.01, 379/93, 24
See application file for complete search history.

(56) References Cited

U.S. PATENT DOCUMENTS

| | | | |
|---|---|---|---|
| 6,061,718 A | 5/2000 | Nelson | |
| 6,163,765 A | 12/2000 | Andric et al. | |
| 6,366,651 B1 | 4/2002 | Griffith et al. | |
| 6,532,446 B1 * | 3/2003 | King | 704/270.1 |
| 6,757,365 B1 * | 6/2004 | Bogard | 379/88.17 |
| 6,836,668 B1 * | 12/2004 | Nakano | 455/466 |
| 6,941,342 B1 * | 9/2005 | Nelson | 709/204 |
| 7,366,500 B1 * | 4/2008 | Yalovsky et al. | 455/414.1 |
| 7,369,988 B1 * | 5/2008 | Thenthiruperai et al. | 704/10 |
| 2001/0047263 A1 * | 11/2001 | Smith et al. | 704/275 |
| 2002/0034956 A1 | 3/2002 | Mekuria | |
| 2002/0097692 A1 | 7/2002 | Ruotoistenmaki | |
| 2002/0133340 A1 * | 9/2002 | Basson et al. | 704/235 |
| 2002/0142787 A1 | 10/2002 | Holley et al. | |
| 2002/0160757 A1 * | 10/2002 | Shavit et al. | 455/414 |
| 2002/0165715 A1 | 11/2002 | Riis et al. | |
| 2003/0002633 A1 | 1/2003 | Kredo et al. | |
| 2003/0054865 A1 * | 3/2003 | Byers et al. | 455/567 |
| 2003/0139922 A1 | 7/2003 | Hoffmann et al. | |
| 2003/0161298 A1 * | 8/2003 | Bergman et al. | 370/352 |
| 2004/0019487 A1 * | 1/2004 | Kleindienst et al. | 704/270.1 |
| 2004/0190689 A1 | 9/2004 | Benitez et al. | |

(Continued)

FOREIGN PATENT DOCUMENTS

EP 1 511 286 3/2005

(Continued)

OTHER PUBLICATIONS

N. Deshmukh, A. Ganapathiraju, J. Picone, *Hierarchial Search For Large Vocabulary Conversational Speech Recognition*, IEEE Signal Processing Magazine, vol. 16, No. 5, pp. 84-107, Sep. 1999.

(Continued)

*Primary Examiner* — Jialong He
(74) *Attorney, Agent, or Firm* — Fay Sharpe LLP

(57) ABSTRACT

A textual representation of a voice message is provided to a communication device, such as a mobile phone, for example, when the mobile phone is operating in a silent mode. The voice message is input by a caller and the voice message converted to phonemes. A text representation of the voice message is transmitted to the mobile phone. The representation includes characters based on the phonemes with well known words being represented in an easily understood shorthand format.

17 Claims, 2 Drawing Sheets

U.S. PATENT DOCUMENTS

| | | | |
|---|---|---|---|
| 2005/0058075 A1 | 3/2005 | Gorday et al. | |
| 2005/0075143 A1 | 4/2005 | Choi | |
| 2005/0250550 A1* | 11/2005 | Fields | 455/567 |
| 2005/0273327 A1 | 12/2005 | Krishnan | |
| 2006/0018440 A1* | 1/2006 | Watkins et al. | 379/88.01 |
| 2006/0121887 A1* | 6/2006 | Chilukoor | 455/412.2 |
| 2007/0112571 A1* | 5/2007 | Thirugnana | 704/270 |

FOREIGN PATENT DOCUMENTS

| | | |
|---|---|---|
| WO | WO 99/50832 | 10/1999 |

OTHER PUBLICATIONS

X. Huang, A. Acero, H.H. Hon, *Spoken Language Processing—A Guide to Theory, Algorithm, and System Development*, Prentice Hall, Upper Saddle River, New Jersey, USA, ISBN: 0-13-022616-5, 2001.

A.Zaenen, J.Mariani, H.Uszkoreit, V.Zue, *Survey of the State of the Art in Human Language Technology*, Cambridge University Press, ISBN 0-521-59277-1, (1996).

ARPabet: http://www.stanford.edu/class/linguist238/fig04.01.pdf., Published 2004.

Intel Solution: http://www.intel.com/business/bss/solutions/blueprints/pdf/emerging_avp.pdf, 2003.

International Phonetic Association: http://www.arts.ala.ac.uk/IPA/ipachart.html, 1993.

Scan Soft naturally Speaking: http://www.nuance.com/naturallyspeaking, 2006.

ScanSoft RealSpeak: http://www.scansoft.com/news/pressreleases/2003/20030520 kpn.asp, 2003.

British Telecom SMS-Voice Service: Jan. 8, 2004, http://www.theregister.co.uk/2004/01/08/bt_trials_mobile_sms/print.html.

E.L.V.I.S. Plateform-Voice Signal Technologies: http://www.voicesignal.com/index.php3. The applicants concede this reference can be used as prior art wherein on p. 2 a 2005 copyright for VoiceSignal Technologies, Inc. is indicated.

IBM Via Voice: http://www-306.ibm.com/software/info1/websphere/index.jsp?tab=products/mobilespeech. The applicants concede this reference can be used as prior art wherein on p. 3 an event is listed as taking place on Oct. 4-8, 2004.

* cited by examiner

SYSTEM AND METHOD FOR PROVIDING A TEXTUAL REPRESENTATION OF AN AUDIO MESSAGE TO A MOBILE DEVICE

BACKGROUND

The exemplary embodiment relates to systems and methods for transmitting and receiving messages and in particular to a system for providing a textual representation of an audio message to a mobile device.

Mobile devices for transmitting and receiving voice communications, such as cell phones are now in widespread use. During meetings and at certain events such as stage and concert events, it is often unacceptable to allow a cell phone to ring. Accordingly, cell phones have been adapted to provide a silent mode which allows a recipient to see that a call has been received. However, the recipient must then leave the meeting or other event to listen to the call or wait until later to retrieve a voice message that the caller has recorded. Neither of these options is entirely satisfactory. Often, users switch their phones off entirely to avoid facing the difficult decision of whether to interrupt a meeting.

Speech recognition systems have been developed which are able to convert voice to text. A standard approach converts speech waveforms into a digital signal split then into pieces of data. The data, comprising sequences of symbols, are then aligned with lexicon entries using search algorithms such as the Viterbi algorithm and disambiguated using, for example, Hidden Markov Models (HMM). For accurate recognition, an extensive lexicon is accessed which allows the detected sounds to be matched with words in the language of the speaker. Such systems thus incorporate substantial memory power and are generally most effective when the system can be trained to the voice of the speaker.

In the case of cell phones, the desire is to maintain a portable and lightweight device which is essentially disposable. Operating systems which have a large memory requirement or which contribute to significant battery consumption are therefore undesirable. Cell phone users have the opportunity to send and receive text messages to generate of the type currently called SMS, an acronym for Short Message Service. An advantage of SMS is that the content of a message is directly sent to a user's cell phone. There is no need to connect to a remote messaging server to access the message. It does not require any vocal component, and it is a relatively unobtrusive operation to read a short text on a cell phone. However, the conventional keypad on mobile devices is quite small and inconvenient to use. Callers who are unable to make contact with the cell phone user often prefer to rely on the recipient retrieving a voice message.

INCORPORATION BY REFERENCE

Published Application No. 2005/0273327, entitled MOBILE STATION AND METHOD FOR TRANSMITTING AND RECEIVING MESSAGES, which issued on Dec. 8, 2005, to Krishnan, discloses a mobile station which includes a controller capable of operating a phoneme engine. The phoneme engine is capable of receiving a message comprising input speech, and thereafter converting the input speech into phonemes representative of the input speech. A transmitter capable of transmitting a representation of the input speech. The representation is based upon the phonemes.

BRIEF DESCRIPTION

In accordance with aspects of the exemplary embodiment disclosed herein, there is provided a method for providing a textual representation of a voice message to a communication device. The method includes detecting that a first communication device is operating in a silent mode, prompting a user of a second communication device to input a voice message, converting the input voice message to phonemes and transmitting a text representation of the voice message to the first communication device, the representation including characters based on the phonemes.

In another aspect, a system for providing a first communication device with a textual representation of a voice message includes a voice message conversion system which converts an input voice message from a second communication device to phonemes and generates a text representation of the input voice message, the text representation including characters based on the phonemes. A switching center is in communication with the voice message conversion system. The switching center is capable of receiving and transmitting messages. The switching center receiving the input voice message from the second communication device and transmits a message to the first communication device, the message comprising the text representation generated by the voice message conversion system.

In another aspect, a method of providing a textual representation of a voice message includes receiving a voice message, converting the voice message to phonemes, the phonemes being selected from a finite set of phonemes, and wherein for the majority of the phonemes in the set, each phoneme is associated in memory with a single representative character, accessing a dictionary of words to identify any words which correspond to a group of the phonemes in the voice message, and, for each phoneme not recognized as being a part of one of groups of phonemes that correspond to a word in the dictionary, representing the phoneme as a representative character. A text representation of the voice message is transmitted to a communication device, the representation including characters representative of at least some of the phonemes.

DETAILED DESCRIPTION

Aspects of the exemplary embodiment relate to a system and method for providing a textual representation of an audio message to a mobile device, such as a mobile phone.

In one aspect, the system is capable of providing a textual representation of a voice recording to a mobile user via a conventional display on the user's phone. The mobile device may receive directly a silent notification of the incoming voice message as well as its written content as a simple SMS (Short Message Service) text message. The system automatically converts recorded voice messages into phonetic SMS style messages which are then sent to the mobile device.

In another aspect a method for providing a textual representation of a voice message to a communication device includes detecting that a first communication device, such as a mobile device, is operating in a silent mode and prompting a user of a second communication device to input a voice message which is to be converted to text. The input voice message is converted to phonemes. A text representation of the voice message is generated from the phonemes and transmitted, e.g., wirelessly in the case of a mobile device, to the first communication device. The representation may include characters representative of some of the phonemes.

While particular reference is made to mobile phones (cell phones) as mobile devices, other mobile devices which receive voice messages are also contemplated, such as laptop computers, personal digital assistants (PDA's), and the like.

In the exemplary embodiment, a voice to SMS conversion mechanism is combined with a messaging service which allows a caller, while recording a voice message on a server, to request an automatic conversion of this message into an SMS. A mobile phone recipient is able to receive on his mobile phone both the notification of a new message and its transcribed content.

The system allows the direct creation of SMS messages using speech without going through the difficulties of using the keyboard of a mobile phone. Additionally, land line users who have no SMS facility can generate SMS messages.

In other aspects, the system may be embedded into a mobile phone therefore taking advantage of training mechanisms based on the user-specific voice to improve the conversion efficiency.

In other aspects, the system provides a written transcription for validation or recording. Such a system can be applied to transcribe a conversation into a phonetic pre-version of a written report that could be automatically sent through SMS or other digital means (e.g. e-mail) to the speakers for information and further treatment.

Figure 1:
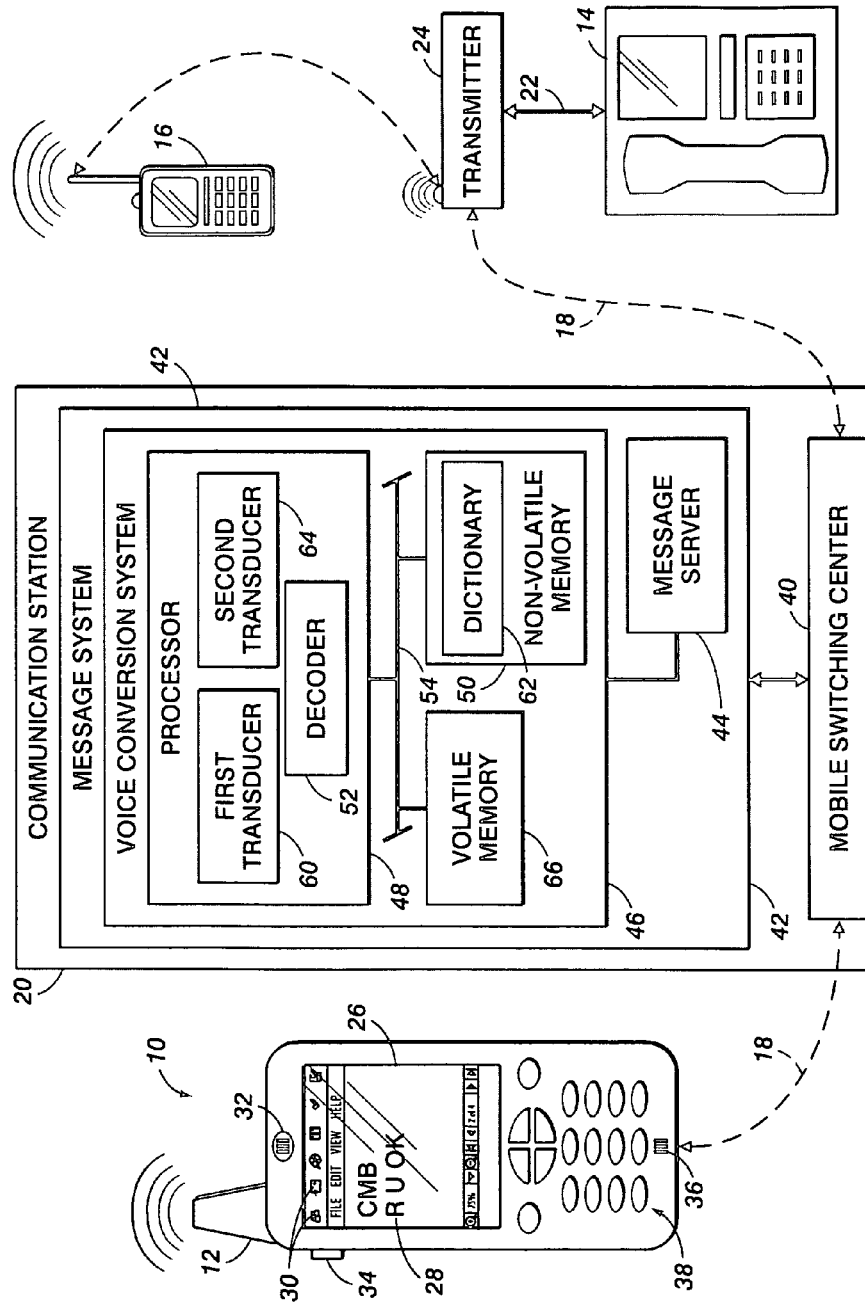
FIG. 1 is a schematic diagram of a system for providing a textual representation of an audio message to a mobile device according to the exemplary embodiment.

With reference to FIG. 1, an exemplary system for providing a user of a communication device, such as a mobile phone user, with a text representation of a voice message is shown. The system includes a first communication device, herein illustrated as a wireless mobile device 10, which includes an antenna 12 for transmitting and receiving audio signals. The mobile device 10 communicates with other voice communication devices 14, 16 via a wireless network 18 which includes one or more communication stations 20. The illustrated voice communication device 14 is a conventional land phone which is at least partially connected with the communication station 18 via a land line 22 and a transmitter 24, while device 16 may be a second mobile device. It will be appreciated that many such devices may form a part of the system.

The mobile device 10 can be a conventional mobile phone with a transmitter and receiver associated with the antenna 12 for receiving and transmitting signals, and a display 26, such as an LCD screen, which is capable of displaying SMS messages 28 and icons 30, such as an icon to indicate that a voice message for the mobile phone 10 has been stored by a remote message server and can be accessed therefrom by the user. The mobile device 10 typically also includes a conventional earphone or speaker 32, a ringer which may be switched on or off with a switch 34, a microphone 36, a keypad 38 and other conventional components not illustrated, such as a battery, non-volatile memory, and volatile memory, such as volatile Random Access Memory (RAM) including a cache area for the temporary storage of data, such as text messages to be displayed on screen 26. The screen 26 can serve as a graphical user interface which enables a user to access a message system for retrieving text and voice messages, and the like, through operation of the keypad 38. The memories can include an identifier, such as an international mobile equipment identification (IMEI) code, capable of uniquely identifying the mobile device to the communication station 20. Devices 14, 16 may be similarly configured to device 10.

The communication station 20 includes a mobile switching center 40 and other components conventionally associated with wireless transmission of audio communications between mobile devices directly or via relay stations and with land lines. The switching center 40 is capable of routing calls and messages to and from the mobile device when the mobile device is making and receiving calls. The mobile switching center 40 also controls the forwarding of messages to and from the mobile device when the mobile device is registered with the network, and also controls the forwarding of messages for the mobile device to and from a message system 42. Such messages may include, for example, voice messages received from voice communication devices 12, 14, 16, which are stored for retrieval on a message server 44, and Short Message Service (SMS) messages received from the mobile device or other mobile devices serviced by the network. In the present application, the switching center 40 also transmits text messages, e.g., SMS messages, which are derived from voice messages according to the methods described herein.

The exemplary message system 42 includes a voice message conversion system 46 which converts an input voice message to an SMS text message. The voice message conversion system 46 includes a speech to text system which converts voice sound into a series of phonemes representative of the input speech and outputs a text message comprising characters based on the phonemes. The illustrated voice message conversion system 46 includes a processor 48 which executes the instructions for converting a voice message to an SMS text message. The instructions may be stored as a software program in associated memory 50. The processor 48 can comprise any suitable computer device which may be separate from the memory or integrated with the memory 50 in a single chip. The processor 48 may be connected with memory 50 and with other components of the message system by a bus 54.

Phonemes are generally defined as a set of symbols that correspond to a set of similar speech sounds, which are perceived to be a single distinctive sound. The processor can convert the input speech into any of a number of known symbols (i.e., phonemes) representative of the input speech, and can convert the input speech into those symbols in accordance with any of a number of known techniques. For example, the input speech can be converted by a decoder 52 into phonemes in the International Phonetic Alphabet of the International Phonetic Association (IPA), the ARPAbet standard, or XSampa. Each of these systems comprises a finite set of phonemes from which the phonemes representative of the sounds are selected.

As will be appreciated, most users are not capable of recognizing the sounds associated with phonemes. Accordingly, the processor 48 may also be capable of further converting the phonemes into text that may be better understood by the user. In one embodiment, a first finite state transducer 60 addresses a dictionary 62 to retrieve one or more commonly used words or phrases in a selected language, such as English. Each word/phrase in the dictionary corresponds to a set of phonemes, which sound out the particular word/phrase in a targeted pronunciation for the selected language. The words and phrases in the dictionary may be expressed in shorthand form, such as that used commonly in SMS messages and widely understood by mobile phone users, often referred to as internet shorthand. The shorthand may include words, phrases, and acronyms and may include combinations of characters, such as combinations of letters and/or numbers. For example, in internet shorthand, "later" is L8R, "before" is B4, and "see you later" is CUL8R. Phonemes which are not recognized in the dictionary may be converted to their phonetic equivalents, i.e., characters which represent to users the phoneme sound by a second finite state transducer 64. Generally, the characters generated by both transducers 60, 64 are letters and numbers. In one embodiment, most phonemes are expressed with a single character. The text message generated by the finite state transducers may be stored in volatile memory 66 during processing.

While the exemplary communication station 20 includes the components illustrated in FIG. 1, it is to be appreciated that the communication station may include other components conventionally associated with communication. Additionally, the components need not be in the same location but may be distributed and communicate, for example, via wired or wireless links. Thus for example, a single voice message conversion system may serve several communication stations.

Figure 2:
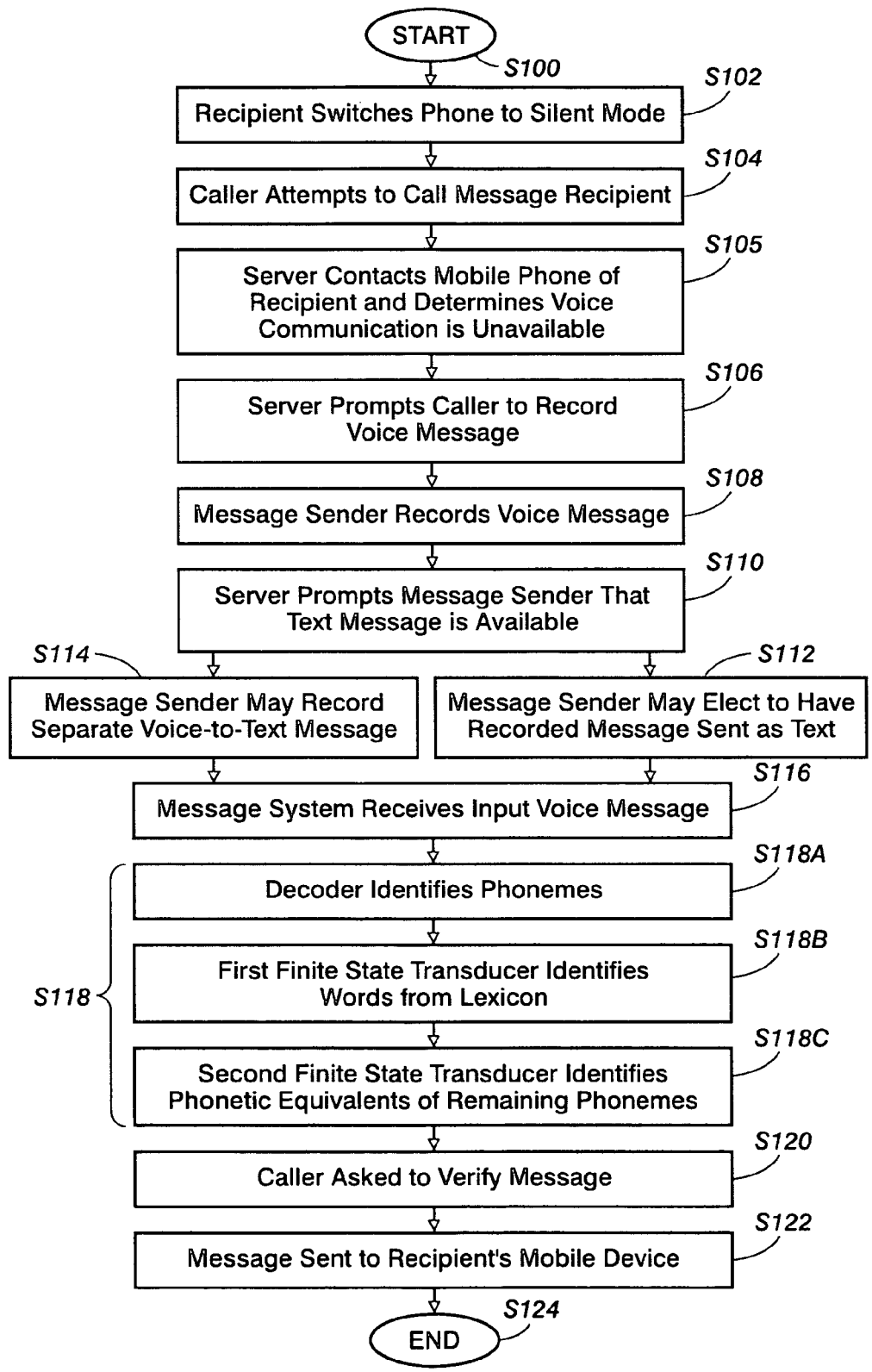
FIG. 2 is a flow diagram of a method for providing a textual representation of an audio message to a mobile device according to the exemplary embodiment.

With reference now to FIG. 2, steps of an exemplary method are illustrated. It is to be appreciated that the method may include fewer, more, or different steps from those illustrated and that the steps need not all be performed in the order illustrated.

The method begins at step S100. At step S102 a user of device 10 (the "recipient") turns his mobile phone to a "silent" mode, e.g., by pressing ringer button 34. Thereafter, any new calls are directly routed to the user messaging system. The user's phone remains silent as if it were turned off. At step S104, a user of device 14 or 16 (the caller) desires to speak with the user of device 10 and enters the phone number of device 10 on his device 14, 16.

The communication station 20 recognizes that the mobile phone is operating in silent mode (S105). The caller is routed to the message system 42, which may present the caller with a prompt to enter a voice message (step S106) to be accessed by the recipient via the recipient's message service. The caller may elect to record a voice message (step S108). Additionally or alternatively, the message system 42 prompts the caller to record a voice-to-text message (a voice message to be converted to an SMS message) if desired (step S10). Although the voice message and voice-to-text message may be the same spoken message, the voice-to-text message is generally a short message which is of a length which can be accommodated by text message systems, e.g., about fifteen to twenty words or less. Thus, a caller may decide to use only a portion of the voice message as the voice-to-text message (step S112) or may record a separate voice-to-text message (step S114). To increase the efficiency of the conversion system and the readability of the output message, the caller may be prompted to dictate the voice-to-text message word by word as a telegraphic message (i.e., leaving gaps between words which are detectable by the voice conversion system 46).

In the illustrated embodiment, the message system 42 receives the voice-to-text message at step S116. At step S118 transcription from speech to an SMS message is performed by the processor 48 using a phonetic transcription mechanism. Step S118 may include the following substeps. At substep S118A, the voice-to-text message is converted to a series of phonemes (e.g., coded using either the phonetic IPA, the ARPAbet standard or XSampa) by the decoder 52. At substeps S118B and S118C, the Finite State Transducer based system maps the phonemes to an SMS transcription. In particular, at substep S118B, the first finite state transducer 60 which encodes a lexicon of commonly used SMS expressions, is applied. At step S118C, any phonemes not recognized by the first finite state transducer 60 are processed by the second finite state transducer 64, which encodes rules for converting the phonemes into a more natural phonetic notation.

Obviously the translation of natural speech into an accurate written transcription that is lexically, syntactically and semantically correct, is not an easy task and is not required for the present application. Generally, only a phonetic SMS style transcription is targeted here. This relatively simple system requires considerably less computation than conventional speech to text conversion systems aimed at accurately converting the entire content of the message into words retrieved from a lexicon. Such systems try to recognize and disambiguate every word by finding alignments with words existing in dictionaries to produce valid and correct words. Rather, the exemplary method creates phonetic SMS style messages, i.e., an easily humanly understandable phonetic encoding of a spoken message.

In one embodiment, the output encoding encodes each phoneme which has not been recognized by the first finite state transducer as a part of one of the words in the lexicon. Each of these residual phonemes may be encoded into a simple one letter per phoneme transcription (except for some very specific phonemes like "gu" or "tch"). The goal of this translation is to produce expressions which are phonetically understandable (e.g., "R U OK": for "Are you OK") by a human reader.

The specific one letter only per phoneme encoding proposed is appropriate for the English and French languages. For languages which use a larger spectrum of phonemes, multi-letter encoding may be more appropriate.

At step S120, the message system 42 may display the converted text message on the screen of the caller's device 16 and the caller prompted to verify the message. The caller may elect to send the message, delete the message, or record a new message. In some embodiments, the caller may be provided with the opportunity to modify the text message, using the keys of the caller's device. In other embodiments, step S120 may be omitted. At step S122, the generated SMS message 28 is sent by the message system 42 to the recipient's mobile phone 10 where it may be automatically displayed on the screen 26. Alternatively, the message may be stored in memory in the mobile phone 10 and its arrival signaled by an icon 30 displayed on the screen 26 and/or by another non-audible signal, such as by a battery vibration. The recipient can then view the message 28 unobtrusively on the screen 26, without disturbing other attendees at the meeting or other event.

The exemplary system and method do not require the voice to text processing software to be stored on a caller or recipient's land phone or mobile phone, but rather on a system 42, remote from the devices 10, 14, 16. By remote, it is meant that the message center communicates via wireless communication with the device generating/receiving the message (or in the case of a land phone, at least partially via a land line). However, in other embodiments, the processing software may be stored in the caller's device. Such an embedded version may also benefit from some specific user voice training.

The principles of speech to text conversion will now be described in further detail. In phonetics, the pronunciation of a word is generally described using a string of symbols that represents phonemes or segments. A phoneme is a distinctive speech sound within the phonology of a language and there are many more phonemes than letters in the common alphabets. Therefore, a specific phoneme notation as been developed, the International Phonetic Alphabet (IPA), evolving from the original standard developed in 1888 by the International Phonetic Association with the objective of transcribing the sound of all human languages. Another alphabet designed specifically for American English (which contains fewer phonemes than those available in the IPA alphabet) is also in wide use. This is known as the ARPAbet and is composed only of ASCII symbols (See, for example, Shoup, J. E., *Phonological Aspects of Speech Recognition*, in Lea, W. A. (Ed.), Trends in Speech Recognition, pp. 125-138 (Prentice-Hall, Englewood Cliffs, N.J. 1980).

Speech recognition begins when a person speaks into a microphone or telephone. This act of speaking produces a sound pressure wave which forms an acoustic signal. The microphone or telephone receives the acoustic signal and converts it to an analog signal that can be understood by an electronic device. Finally, to store the analog signal on a computer (a digital device), it is converted to a digital signal.

A speech recognizer in decoder 52 is used to decode the digital signal. However, the signal, as first captured by the microphone or telephone, generally contains information in a form that the recognizer cannot yet decode. Only certain attributes or features of a person's speech are helpful for decoding. These features allow the recognizer to differentiate among the phonemes (patterns of vowels and consonants) that are spoken for each word. They may be numerically measured and stored in a form the recognizer can process. This form is called a feature vector.

The process of taking these measurements is known as Feature Vector Extraction. Other feature extraction methods include Front-End Processing, Digital Signal Processing and Signal Modeling. In modern speech recognition systems, feature extraction typically includes the process of converting the signal to a digital form (i.e., signal conditioning), measuring some attribute of the signal, such as energy or frequency response (i.e., signal measurement), augmenting these measurements with some perceptually-meaningful derived measurements (i.e., signal parameterization), and statistically conditioning these numbers to form observation vectors.

Spectrograms provide one way of viewing the speech signal, e.g., plotting changes in the energy of the signal at specific frequency values over time. The energy values for the spectrogram may be extracted by computing a Fourier Transform, a mathematical technique that allows the frequency spectrum of the signal to be computed given a small amount of data, or window. This process is also known as converting from the Time Domain to the Frequency Domain.

Once the feature vectors have been generated from the input sound, the next step is to recognize phonemes or entire words from these vectors. To do so, an alignment process is performed between the data carried by the feature vectors and an acoustic model. Acoustic models can be either composed of word models or phoneme models.

Word models encompass all phonemes necessary to form a word. Word models are generally used for recognition of words in a short list. They are not very effective for handling large vocabularies because this technique encodes the recognition pattern as one single piece of information for each word (all the phonemes are aggregated in one single sound). Therefore the more entries that are contained in a list the more memory is required to store all the information. For large vocabularies, phoneme models are more practical.

Phoneme models encode words as a specific ordered list of phonemes which are the smallest distinctive acoustic components of a language. For example, the English language consists of about 40 to 43 phonemes. This decomposition of words into phonemes allows storage optimization using for example Finite State Transducers. Words with a common order of phonemes share the same part of the network.

The next phase is the search for the most probable word matching the sequence of phonemes in the language model. Continuous speech recognition is both a pattern recognition and search problem. The complexity of search algorithms depends on many things, including the number and types of networks being searched. Speech recognition typically uses a hierarchical Viterbi beam search algorithm for decoding because of its speed and simplicity of design. Such techniques are described, for example, in Deshmukh N., Ganapathiraju A., Picone J., *Hierarchical Search for Large Vocabulary Conversational Speech Recognition*, IEEE Signal Processing Magazine, vol. 16, no. 5, pp. 84-107 (September 1999) and in Huang X, Acero A., and Hon H. H., *Spoken Language Processing—A Guide to Theory, Algorithm, and System Development* (Prentice Hall 2001).

When using search techniques, a process known as pruning is typically employed. Pruning removes unlikely paths from consideration and saves resource usage in both memory and time. In Viterbi algorithms, pruning takes place at the lowest level after evaluation of the statistical model. Paths with the same history can be compared—the best scorer is propagated and the other is deleted. Viterbi pruning generally requires an efficient storage scheme so that it is only necessary to compare a small number of data elements to determine those that are comparable. Recognition systems use many forms of pruning. In challenging environments, such as for conversational speech collected over noisy telephone lines, extremely aggressive pruning is generally desirable to avoid exceeding the physical memory capacities of a computer system.

The speech-to-text systems may include natural language processing components to best predict or disambiguate words according to the context.

Training processes are generally applied to improve the alignment between feature vectors and acoustic models. Training can also be applied to improve the prediction of words according to the context.

To facilitate identification of words it is helpful for the input speech to be tokenized. In one embodiment, the input text is spoken word by word with a slight silence between each word (a few milli-seconds is generally sufficient, depending on the detection capabilities of the acoustic decoder), as in a telegraphic style. By tokenizing the words, an output which is more meaningful to a user can be generated without relying on natural language processing of the output message. Except for those words identified from the lexicon as specific SMS expressions, words have no meanings in the exemplary transcription method. Therefore, to increase readability in the generated output text, a clear separation between words avoids generating a continuous and hard to decipher string of characters.

The exemplary processor 48 executes instructions for performing the method step S118. The first part of the system relies on the common speech to text technology converting speech sound into phonemes after Feature Vector extraction and comparison with Acoustic Models.

The decoder 52 first detects the phonemes and the first transducer 60 works in a similar way to a classical speech to text system by trying to find alignment between the input list of phonemes and the dictionary 62 of SMS expressions stored along with their phonetic encoding. This list may be much shorter than dictionaries containing all the words of a natural language. For example the list of SMS expressions may include about one thousand words or less. Once an SMS expression is detected, its customary notation is transcribed in the output.

The second transducer 64 applies specific transformation rules on the remaining phonemes. This operation is performed because the ARPAbet (and to a much larger extent, the IPA alphabet) uses a specific notation to encode phonemes that is not widely known. To express a specific phoneme, the ARPAbet frequently uses two or three ASCII letters. The present transformation reduces the expressiveness of phoneme encoding, resulting in the production of ambiguities. For example, the words "see" or "sea" may both (according to the user pronunciation) be converted using the same shorthand code (e.g., C). However, this ambiguity does not generally pose a problem given the decoding capabilities of the human brain which is able to disambiguate a word given its syntactic and semantic context (for example in the given sentence, "the ship is cruising in the open C," the symbol "C" can only be understood by "Sea").

Nevertheless one problem may arise during the decoding step of speech to phoneme. Depending on the quality of the microphone or user pronunciation, it may be difficult for the decoder 52 to associate the correct phoneme to a specific sound in some instances, leading to ambiguities. In one embodiment, N-grams or a weighted finite state transducer may be used on sequences of phonemes to help select, in cases of ambiguity for a specific phoneme, which may be the right one according to the context. For example, N-grams of a fixed number of potential phonemes, such as two, three or more potential phonemes are considered and their probabilities of co-occurrence compared to determine the most probable set of phonemes in the N-gram or in a group of N-grams.

In general, even if the correct phoneme is not identified in some instances, the related sound should be understandable for the human brain decoding capabilities to allow the understanding of the global context (word or sentence).

The pseudo-phonetic transformation rules may be customized for the specific language pronunciation targeted. For example the word "butter" will be pronounced differently by an American and an English person. In American English the letters "tt" will be pronounced "dx" (ARPAbet notation for "d") while in standard English (such as Received Pronunciation), it will be pronounced "t". Therefore to increase the efficiency of the SMS message generation the converter is customized to the targeted population's pronunciation habits.

To test the feasibility of the system, a small prototype system was implemented. This system used as an input a sequence of phonemes (using the ARPAbet notation) similar to those generated by the first stage of a standard STT system. The prototype then applied an SMS common expression detection and a phoneme transformation. The dictionary of common SMS expressions used for the prototype contained only a very limited number of words: your (YR), you (U), tomorrow (2MORO), today (2DAY), thanks (THX), please (PLZ), waiting (W8TNG), wait (W8), great (GR8), meeting (MTNG), office (OFIS), sister (SIS), brother (BROS), later (L8R), late (L8), for (4), to (2), see (C), be (B), one (1), two (2), to (2), three (3), four (4), five (5), six (6), seven (7), eight (8), nine (9), ten (10), eleven (11), twelve (12), call me back (CMB).

The transformation rules applied on the ARPAbet phoneme notations which contain several letters (phonemes coded with only one letter are left un-changed) were the following for American English (including also some special transformations):

| Consonants: | Vowels |
|---|---|
| [g] -> [gu] | [iy] -> [i] |
| [q] -> [h] | [ih] -> [i] |

-continued

| Consonants: | Vowels |
|---|---|
| [dh] -> [d] | [ix] -> [i] |
| [zh] -> [z] | [ey] -> [ei] |
| [ch] -> [tch] | [eh] -> [e] |
| [jh] -> [j] | [ae] -> [a] |
| [dx] -> [tt] | [aa] -> [a] |
| [nx] -> [n] | [ao] -> [o] |
| [el] -> [l] | [ax] -> [e] |
| | [oh] -> [oo] |
| | [ow] -> [o] |
| | [uw] -> [u] |

The following figure presents an example of message conversion.

1. Input Sentence:
   "Hello it's your sister. See you tonight at eight for the meeting. Call me back."
2. Sentence converted into sequence of phonemes:
   h ax l ow ix t s y uh aa r s ih s t ae t ax r s ih y uh t uh n aa ih t aa t ey ih t f ao r dh ax m ih t ih n g k aw l m ih b aa k
3. Output as shorthand text:
   helo its YR SIS
   see U 2NITE at 8
   4 de MTNG
   CMB As observed, the result is not always well formed but is still comprehensible and even possible ambiguities can be resolved by the context.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of providing a first communication device with a textual representation of a voice message transmitted from a second communication device, the method comprising:
   detecting that the first communication device is operating in a silent mode in which the first communication device is switched on but wherein calls are directly routed to a user's messaging system;
   in response to said detection, prompting a user of the second communication device to input a voice message;
   converting the input voice message to phonemes;
   accessing a dictionary of words and their corresponding phonemes to identify, where present, a word which corresponds to a group of the phonemes;
   for each phoneme not recognized as part of a word in the dictionary, representing the phoneme as a representative character; and
   automatically transmitting a textual representation of the converted voice message to the first communication device, the representation including characters based on the phonemes and words identified in the dictionary that correspond to a group of the phonemes.

2. The method of claim 1, further comprising:
   automatically displaying the textual representation on the first communication device.

3. The method of claim 1, wherein the phonemes are selected from a finite set of phonemes and wherein each phoneme is associated with a representative character and wherein the representation of phonemes not recognized as part of a word includes representing the phoneme as its representative character.

4. The method of claim 3, wherein the representative characters include letters and numbers.

5. The method of claim 3, wherein for at least a majority of the phonemes, each phoneme is associated with a single representative character.

6. The method of claim 1, wherein the conversion of the input voice message includes converting the voice message to feature vectors, each feature vector corresponding to at least one phoneme.

7. The method of claim 1, wherein the first communication device comprises a mobile phone.

8. The method of claim 1, wherein the prompting of the user comprises:
prompting the user to space each word of the message by a gap while speaking the message.

9. The method of claim 1, wherein the transmitting of the textual representation of the voice message to the first communication device includes wirelessly transmitting the textual representation to the first communication device.

10. The method of claim 1, wherein the converting of the input voice message to phonemes and the transmitting of the textual representation of the voice message to the first communication device are performed by a communication station remote from the first and second communication devices.

11. The method of claim 1, further comprising prompting a user of the second communication device to input a second voice message; and
storing the second voice message in a message server accessible by the first communication device.

12. A system for providing a first communication device with a textual representation of a voice message transmitted from a second communication device comprising:
a voice message conversion system which converts an input voice message from the second communication device to phonemes and generates a textual representation of the input voice message, the textual representation including characters based on the phonemes;
wherein the voice message conversion system comprises:
a first transducer which accesses a dictionary of words to identify a group of the phonemes which corresponds to a word;
a second transducer which, for each phoneme not recognized as part of the word in the dictionary, represents the phoneme as a character; and
a switching center in communication with the voice message conversion system, which is capable of receiving and transmitting messages, the switching center receiving the input voice message from the second communication device and transmitting a message to the first communication device, the first communication device comprising a mobile phone, the message comprising the textual representation generated by the voice message conversion system, the switching center detecting that the first communication device is operating in a silent mode and, in response to said detecting that the first communication device is operating in a silent mode, prompts a user of the second communication device to input the voice message for conversion by the voice message conversion system to the textual representation.

13. The system of claim 12, wherein the voice message conversion system is remote from the first and second communication devices.

14. The system of claim 12, wherein the switching center transmits the message comprising the textual representation wirelessly to the mobile phone.

15. The system of claim 12, further comprising a messaging system in communication with the switching center, which stores at least one of the voice message and a second voice message received from the second communication device.

16. A method of providing a first communication device with a textual representation of a voice message transmitted from a second communication device, comprising:
detecting that the first communication device is operating in a silent mode;
in response to said detection, prompting a user of the second communication device to input a voice message;
converting the voice message to phonemes, the phonemes being selected from a finite set of phonemes, and wherein for the majority of the phonemes in the set, each phoneme is associated in memory with a single representative character;
accessing a dictionary of words to identify any words which correspond to a group of the phonemes in the voice message, the dictionary storing words along with their corresponding phonemes, at least some of the words comprising Short Message Service (SMS) expressions; and
for each phoneme not recognized as being a part of one of groups of phonemes that correspond to a word in the dictionary, representing the phoneme as a representative character; and
transmitting a textual representation of the voice message to the first communication device, the representation including characters representative of at least some of the phonemes.

17. The method of claim 16, further comprising displaying the textual representation on the first communication device.

* * * * *